(12) United States Patent  (10) Patent No.: US 7,504,037 B2
Gibbs  (45) Date of Patent: Mar. 17, 2009

(54) OIL AND VAPOR RECOVERY SYSTEM

(75) Inventor: Paul Gibbs, Midland, TX (US)

(73) Assignee: Paul Gibbs, Midland, TX (US)

( * ) Notice: Subject to any disclaimer, the term of this patent is extended or adjusted under 35 U.S.C. 154(b) by 0 days.

(21) Appl. No.: 11/783,437

(22) Filed: Apr. 10, 2007

(65) Prior Publication Data

US 2008/0251441 A1 Oct. 16, 2008

(51) Int. Cl.
*C02F 1/40* (2006.01)

(52) U.S. Cl. .................. 210/776; 210/800; 210/122; 210/188; 210/242.3; 210/539; 210/540; 95/253; 96/183

(58) Field of Classification Search .................. 210/776, 210/800, 122, 188, 242.3, 537, 538, 539, 210/540; 95/253; 96/182, 183
See application file for complete search history.

(56) References Cited

U.S. PATENT DOCUMENTS

| | | | | |
|---|---|---|---|---|
| 1,107,391 A | * | 8/1914 | Welch | 210/242.3 |
| 1,450,545 A | * | 4/1923 | Hans | 210/122 |
| 3,849,311 A | | 11/1974 | Jakubek | |
| 4,022,696 A | | 5/1977 | Krofta | |
| 4,132,645 A | * | 1/1979 | Bottomley et al. | 210/540 |
| 4,391,704 A | * | 7/1983 | Anderson | 210/188 |
| 4,892,666 A | * | 1/1990 | Paulson | 210/776 |
| 5,104,525 A | | 4/1992 | Roderick | |
| 5,143,603 A | * | 9/1992 | Gibbs | 210/540 |
| 5,143,629 A | | 9/1992 | Lint | |
| 5,453,179 A | * | 9/1995 | Stultz | 210/539 |
| 5,478,483 A | | 12/1995 | Gore | |
| 5,713,697 A | | 2/1998 | Steiner | |
| 5,820,751 A | * | 10/1998 | Faircloth, Jr. | 210/122 |
| 5,888,406 A | | 3/1999 | Hnatiuk | |
| 5,922,064 A | * | 7/1999 | Gordon, Sr. | 210/539 |
| 5,942,128 A | | 8/1999 | Fortier | |
| 5,968,351 A | | 10/1999 | Fortier | |
| 6,159,362 A | | 12/2000 | Gilmore | |
| 6,277,287 B1 | * | 8/2001 | Terrien et al. | 210/242.3 |
| 6,358,409 B1 | | 3/2002 | Jacoby, Jr. et al. | |
| 2004/0045912 A1 | | 3/2004 | Guilmette | |

OTHER PUBLICATIONS

PCT/IB2005/003318 International Search Report, Feb. 8, 2007.

* cited by examiner

*Primary Examiner*—Christopher Upton
(74) *Attorney, Agent, or Firm*—Merek, Blackmon & Voorhees, LLC

(57) ABSTRACT

An oil and vapor recovery system having a float system for adjusting the height of oil and vapor recovery intakes. The float system is preferably adjustable to allow connection of additional floats to maintain buoyancy and keep the vapor intake above the level of the oil in the holding tank and to maintain the oil intake above the level of the water contained in the holding tank. Vapor is drawn out of the holding tank using a vacuum assisted siphon. Oil can be withdrawn from the holding tank by suction or simply by letting the oil flow into an outlet by gravity.

15 Claims, 4 Drawing Sheets

OIL AND VAPOR RECOVERY SYSTEM

FIELD OF THE INVENTION

The present invention relates to an oil recovery system for maximizing the extraction of oil from subterranean oil bearing strata. More particularly, the invention relates to an improved separation system for collecting oil and oil vapor from holding tanks containing a mixture of oil and water.

BACKGROUND OF THE INVENTION

In the extraction of crude oil from underground oil bearing formations water is often mixed with the extracted oil due to naturally occurring underground water or due to injected water from secondary recovery operations. The oil must be separated from the water so that the oil can be transported off the wellsite. To separate the oil from the water, holding tanks are set up at the wellsite and the oil floats to the top. Further, various vapors including oil vapor and/or natural gas separate from the oil and gas mixture and float above the oil inside the holding tank. As the level between the oil and water and vapor and oil fluctuates within the holding tank depending on the relative concentrations of water, oil and vapor being extracted from the well, a height adjustable device containing siphons to remove the separated, water, oil and vapors is necessary to compensate for the fluctuating levels.

In view of the foregoing it can be see that there is a need for a buoyancy system having a vapor recovery apparatus and an improved oil collection drain to improve vapor and oil recovery from oil and water separation tanks in the oil extraction industry.

OBJECTS AND SUMMARY OF THE INVENTION

It is an object of the invention to provide an apparatus for the removal of oil and vapor from oil production holding tanks.

Another object of the invention is to provide an apparatus which will operate to remove oil and/or vapors from an oil production holding tank and automatically adjust to the levels of oil and water in the holding tank.

Other objects and advantages will be apparent to those skilled in the art upon review of the detailed description of the invention and accompanying drawings appended hereto.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, the present invention is directed to an oil and vapor recovery system having a float system for adjusting the height of oil and vapor recovery intakes. The float system is preferably adjustable to allow connection of additional floats to maintain buoyancy and keep the vapor intake above the level of the oil in the holding tank and to maintain the oil intake above the level of the water contained in the holding tank. Vapor is drawn out of the holding tank using a vacuum assisted siphon. Oil can be withdrawn from the holding tank by suction or simply by letting the oil flow into an outlet by gravity.

When suction is used to draw the oil out of the holding tank, an intake is used having preferably four upwardly facing slanted openings to direct suction upward to help prevent coning of water and provide for more efficient removal of oil with less water drawn in when the oil layer gets thinner.

The buoyancy system uses vertically spaced floats having different buoyancy rates. The lower floats are buoyant in water but not in oil to maintain the oil outlet above the water level in the holding tank while the upper floats are buoyant in oil and maintain the vapor outlet above the oil level in the holding tank.

DETAILED DESCRIPTION OF THE PREFERRED EMBODIMENT

Figure 1:
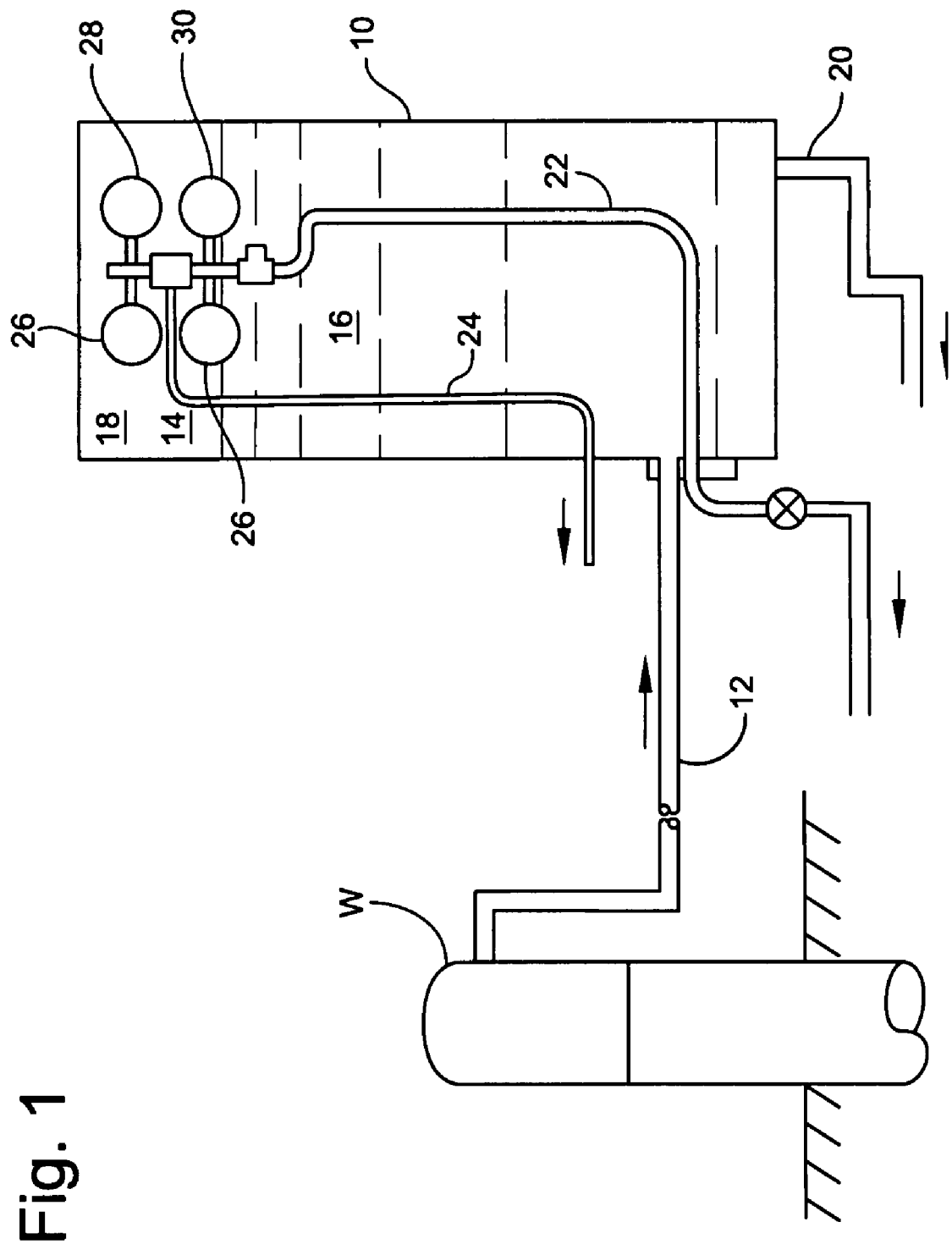
FIG. 1 is a schematic view of the buoyancy system.

FIG. 1 shows a schematic view of a holding tank 10 for receiving oil/water mixture. As the oil/water mixture is pumped into the holding tank 10 from inlet pipe 12 the oil 14 separates from the water 16. Additionally, vapor 18 which may be oil vapor or natural gas will collect above the oil 14. Water 16 is drained or pumped from tank 10 via outlet pipe 20, and may be returned to the well W for reuse. Oil 14 is drained or pumped from the tank 10 via flexible oil recovery hose 22 and sent to a separate holding tank or pipeline for transport to a refinery. Likewise, vapor 18 is removed via a vacuum hose 24 and is sent to another holding tank or pipeline for transport to a refinery.

The oil recovery hose 22 is constructed of flexible oil resistant material such as neoprene or other plastic material having properties necessary to withstand corrosive substances commonly found in crude oil. The oil recovery hose 22 is supported within the tank 10 by floats 26. Floats 26 are may be formed of rubber, plastic or stainless steel or other suitable material that is both buoyant and resistant to corrosive substances commonly found in crude oil. As can be seen in FIG. 1, floats 26 include an upper set of floats 28 and a lower set of floats 30.

Figure 2:
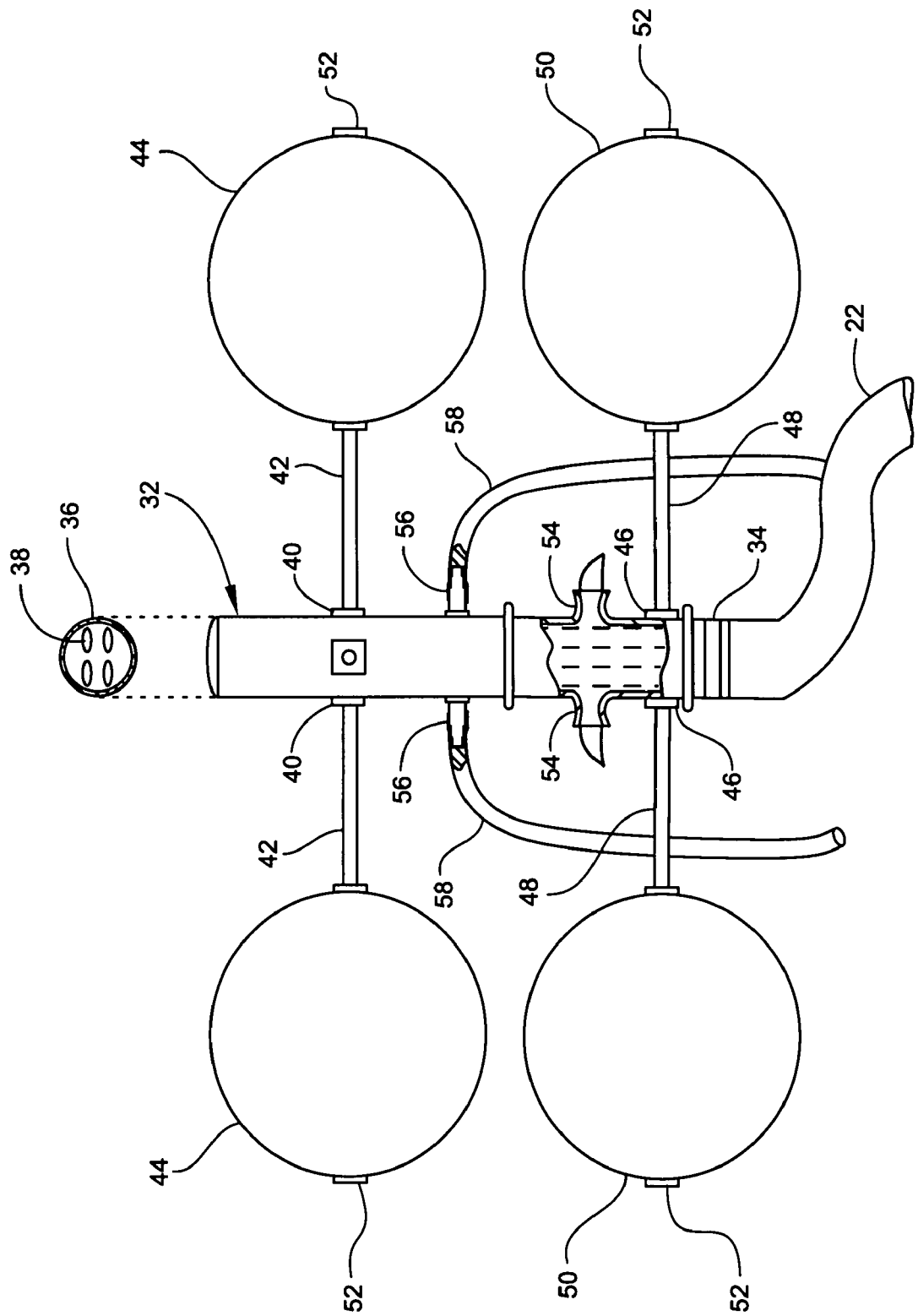
FIG. 2 is a schematic view of an upper portion of the buoyancy system of FIG. 1.

Now with reference to FIG. 2, it can be seen that oil recovery hose 22 includes a preferably rigid pipe component 32 joined thereto at connection 34. At the upper end of the pipe component is a top or cap 36 having openings 38 therein. Spaced downwardly from the upper end 34 are upper attachment ports 40 for connecting upper float arms 42 extending from upper floats 44. Lower attachment ports 46 are spaced below upper attachment ports 40. Lower float arms 48 extend from lower attachment ports 46 and join lower floats 50 to the lower attachment ports 46. Upper floats 44 and lower floats 50 have additional attachment ports 52 so that additional floats 46 or 50 can be added for greater buoyancy.

It is important to note that the buoyancy of upper floats 44 is greater than that of lower floats 50 so that lower floats 50, while being buoyant in water 16 are not buoyant in oil 14. Upper floats 44 are buoyant in both water 16 and oil 14. Using this difference in buoyancy between the upper floats 44 and the lower floats 50, the top 36 is maintained above the upper level of the oil 14 and the oil drain openings 54 are maintained above the upper level of the water 16.

Vacuum hose ports 56 are located above the oil drain openings 54 to prevent oil from being drawn into the vacuum hoses 58 which draw the vapor through the openings 38 of cap 36 and transport the vapors out of the tank 10.

Figure 3:
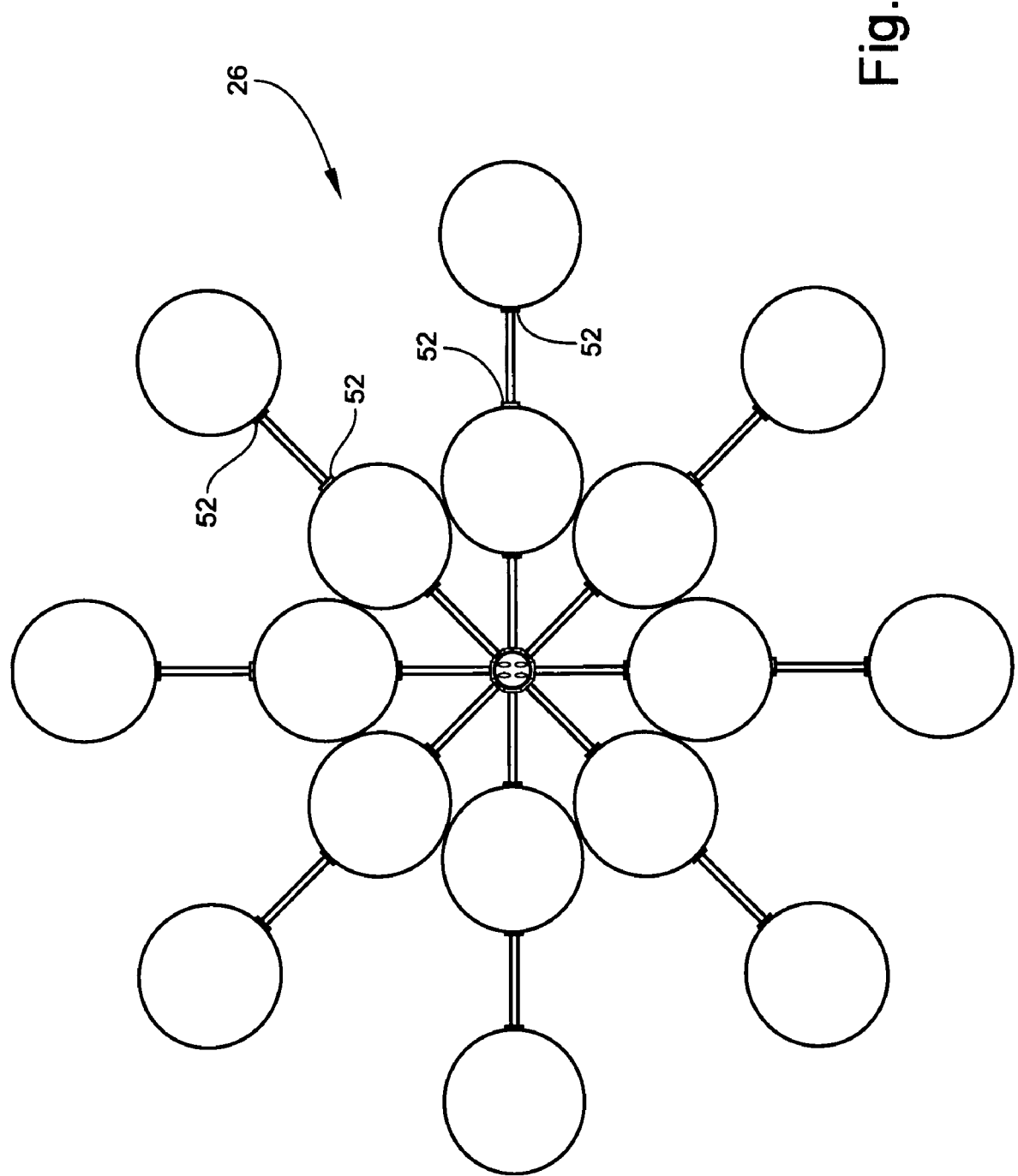
FIG. 3 is a top view of the vapor intake and float system; and,
FIG. 4 is a side view of the oil outlet with portions broken away; and,
FIG. 5 is a top view of the oil outlet of FIG. 4.

Now with reference to FIG. 3, an array of floats 26 is shown. Using attachment ports 52, floats 26 can be added or removed to control buoyancy.

Factors affecting buoyancy include the weight of the hoses 22 and 58 which may vary due to changes in diameter and materials thus requiring an adjustment of the number of floats 44 and/or 50 to achieve the correct calibration.

Figure 4:
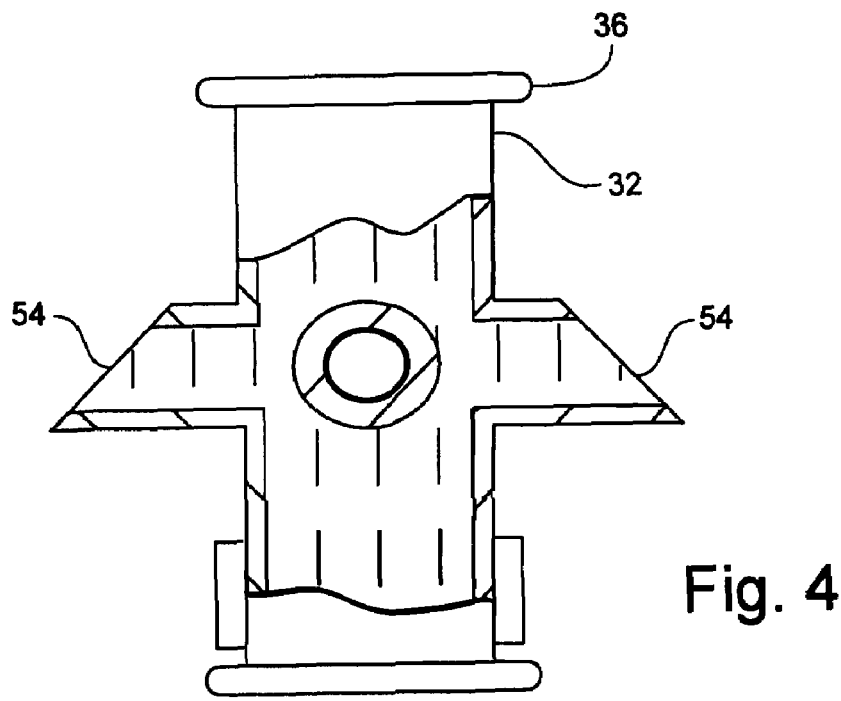
Figure 5:
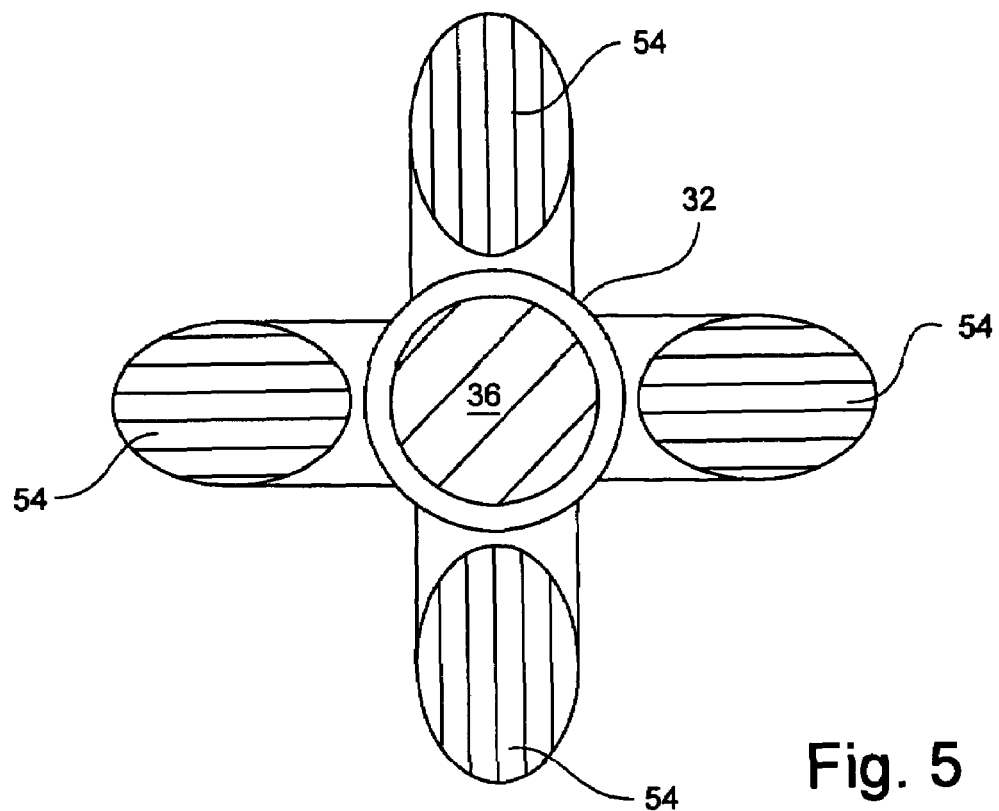

FIGS. 4 and 5 show detailed views of the preferred embodiment of oil drain openings 54. The drain openings are spaced about a portion of the pipe component 32 and open upwardly. The upwardly opening design aids in the prevention of water being drawn up into the oil drain openings since any whirl pooling caused by the flow of oil 14 into the drain openings 54 will extend upwardly away from the water 16. FIG. 4 shows the openings 54 extending outwardly from the pipe component 32.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

I claim:

1. An oil and vapor recovery apparatus comprising;
   a) a holding tank for receiving fluids containing oil and water;
   b) an inlet pipe for supplying fluids containing oil and water to said holding tank;
   c) a float apparatus located in said holding tank and said float apparatus having buoyant floats connected thereto;
   d) an oil recovery pipe connected to said floats and said oil recovery pipe having an oil receiving opening therein for draining oil from said holding tank;
   e) a vapor receiving opening in said oil recovery pipe for removing vapor from said holding tank;
   f) a vacuum apparatus connected to said oil recovery pipe located above said oil receiving opening; and
   g) said vacuum apparatus having a hose connected to said oil recovery pipe for removing vapor from said holding tank.

2. The oil and vapor recovery apparatus as set forth in claim 1 wherein:
   a) said holding tank includes a water outlet,
   b) said water outlet is located at a lower end of said holding tank.

3. The oil and vapor recovery apparatus as set forth in claim 1, wherein;
   a) said float apparatus includes attachment ports to permit the connection or removal of floats.

4. An oil and vapor recovery apparatus comprising:
   a) a holding tank for receiving fluids containing oil and water;
   b) an inlet pipe for supplying fluids containing oil and water to said holding tank;
   c) a float apparatus located in said holding tank and said float apparatus having buoyant floats connected thereto;
   d) an oil recovery pipe connected to said floats and said oil recovery pipe having an oil receiving opening therein for draining oil from said holding tank;
   wherein:
   e) said float apparatus includes an upper set of floats and a lower set of floats,
   f) said upper set of floats being spaced vertically above said lower set of floats.

5. The oil and vapor recovery apparatus as set forth in claim 4 wherein;
   a) said oil receiving opening is located between said upper set of floats and said lower set of floats.

6. The oil and vapor recovery apparatus as set forth in claim 4, wherein;
   a) said lower set of floats is buoyant in water.

7. The oil and vapor recovery apparatus as set forth in claim 6, wherein;
   a) said lower set of floats are not buoyant in oil.

8. The oil and vapor recovery apparatus as set forth in claim 4, wherein;
   a) said upper set of floats is buoyant in oil.

9. A method of removing oil and vapor from a separation tank comprising the steps of:
   a) introducing a quantity of water and oil into a separation tank;
   b) allowing said oil and water to separate;
   c) removing oil from said separation tank using a system of floats to maintain an oil drain opening above said water connected to an oil recovery pipe;
   d) removing vapor from said separation tank using a vacuum-assisted vapor recovery system;
   e) using a vacuum assist vapor recovery system includes a vacuum apparatus connected to said oil recovery pipe located above said oil drain opening; and,
   f) said vacuum apparatus having a hose connected to said oil recovery pipe for removing vapor from said holding tank.

10. The method as set forth in claim 9, further comprising the step of;
    a) Providing said holding tank with a water outlet; and,
    b) said water outlet is located at a lower end of said holding tank.

11. The method as set forth in claim 9, further comprising the step of;
    a) providing said system of floats with attachment ports to permit the connection or removal of floats.

12. A method of removing oil and vapor from a separation tank comprising the steps of:
    a) introducing a quantity of water and oil into a separation tank;
    b) allowing said oil and water to separate;
    c) removing oil from said separation tank using a system of floats to maintain an oil drain opening above said water connected to an oil recovery pipe;
    d) removing vapor from said separation tank using a vacuum-assisted vapor recovery system;
    e) using a system of floats includes providing an upper set of floats and a lower set of floats; and,
    f) said upper set of floats being spaced vertically above said lower set of floats, and
    g) said oil drain opening is located between said upper set of floats and lower set of floats.

13. The method as set forth in claim 12, wherein;
    a) said lower set of floats is buoyant in water.

14. The method as set forth in claim 13, wherein;
    a) said lower set of floats are not buoyant in oil.

15. The method as set forth in claim 12, wherein;
    a) said upper set of floats is buoyant in oil.

* * * * *